United States Patent

[11] 3,612,000

[72] Inventors Karl-Heinrich Lochmann
  Frankfurt-Niederrad;
  Gerhard Dinges, Gelnhausen, both of Germany
[21] Appl. No. 714,711
[22] Filed Mar. 20, 1968
[45] Patented Oct. 12, 1971
[73] Assignee Licentia Patent-Verwaltungs-GmbH
  Frankfurt, Germany
[32] Priority Mar. 27, 1967
[33] Germany
[31] L 56075 Ia/138

[54] SATURATED-STEAM GENERATOR
  12 Claims, 5 Drawing Figs.
[52] U.S. Cl. .................................................... 122/31
[51] Int. Cl. ..................................................... F22b 1/14
[50] Field of Search ........................................ 122/31, 32; 261/114

[56] References Cited
UNITED STATES PATENTS
3,324,835 6/1967 Ritz .............................. 122/31
3,338,566 8/1967 Rittel ........................... 261/114 X Primary Examiner—Kenneth W. Sprague
Attorney—Spencer & Kaye ABSTRACT: A saturated-steam generator of the Löffler type having a plurality of evaporator cups or levels disposed in series within a boiler vessel and an inlet pipe extending centrally through the evaporator cups. The inlet pipe includes a separate opening for each evaporator cup. A conduit leads from each inlet pipe opening to a chamber in the bottom of the associated evaporator cup. Perforations are provided in the bottom of the evaporator cup. Hot steam is delivered from the inlet pipe to the chamber in the bottom of the evaporator cup. The hot steam then passes through the perforations into boiling water held by the evaporator cup for processing to a supersaturated state.

Inventors:
Karl-Heinrich Lochmann
Gerhard Dinges
By: Spencer & Kaye
Attorneys

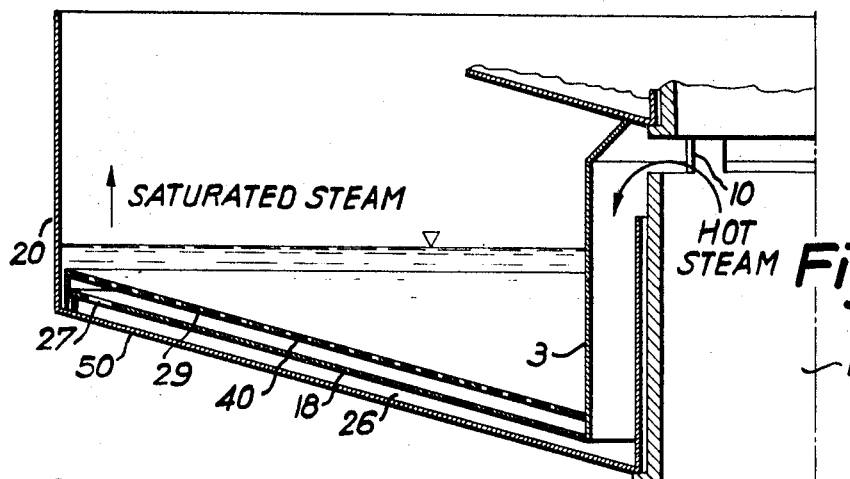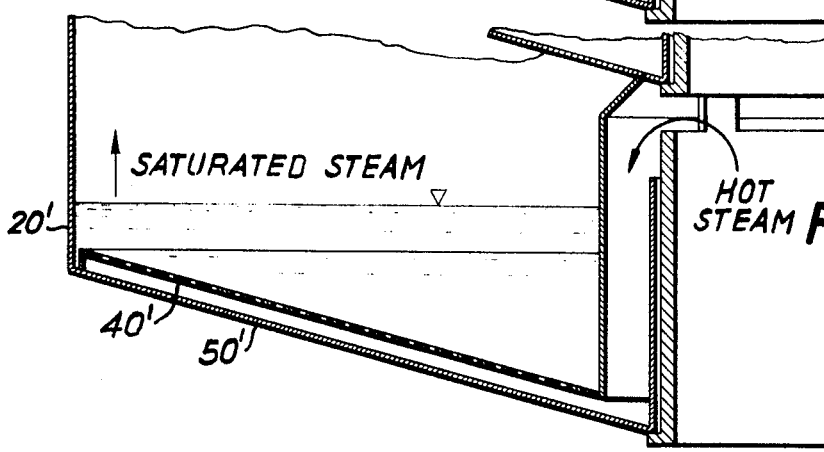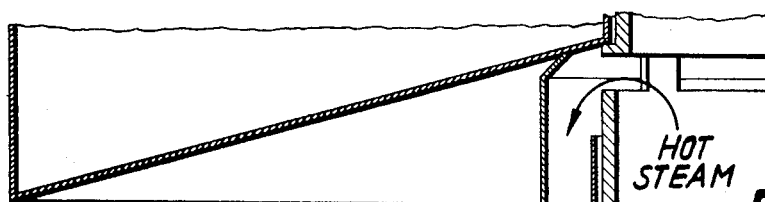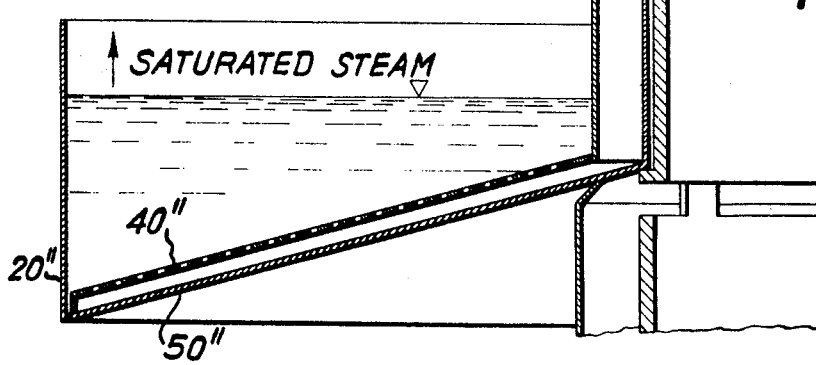

3,612,000

SATURATED-STEAM GENERATOR

BACKGROUND OF THE INVENTION

The present invention relates to a saturated-steam generator and particularly to a saturated-steam generator of the Löffler boiler type described in the U.S. application, Ser. No. 631,737 filed Apr. 18, 1967 for use with steam-cooled nuclear reactors.

One way of generating the large quantities of saturated steam required by steam-cooled nuclear reactors makes use of Löffler-type boilers.

The known Löffler boilers generally comprise a noncirculatory water vaporizer in which superheated steam is blown into a body of water through a system of tubes. Such boilers have been constructed in cylindrical or spherical form. Saturated steam is generated by applying the heat from a superheater directly to the water to be vaporized. Only a single water level was provided in such boilers and, as a result, the ratio of the water surface area to its volume is very low, especially under high pressure, so that in order to produce the large amounts of high-pressure saturated steam required by nuclear reactors, a boiler of undesirably large overall dimensions and great wall thicknesses was required.

The U.S. application Ser. No. 631,737, filed Apr. 18, 1967, describes an improvement upon prior art Löffler boilers. According to the teaching of this application, a Löffler-type boiler is provided wherein a plurality of water levels are stacked in a boiler vessel, with each water level being provided with a separate superheated (hot) steam delivery system and a separate water inlet. Moreover, the mentioned application provides steam discharge pipes and/or steam guide channels above each water level. While the teaching of the mentioned application greatly improved Löffler-type boilers and eliminated many of the drawbacks of similar prior art boilers, saturated-steam generators of this type still require relatively high construction expenditures even though the stacking of the water levels permits a compact overall construction. Therefore, the present invention is directed to further improve the Löffer-type saturated-steam generator.

SUMMARY OF THE INVENTION

It is therefore an object of the present invention to generate large quantities of high-pressure saturated steam in an efficient manner.

It is also an object of the present invention to improve upon the prior art in the construction of Löffler-type boilers.

It is yet another object of the present invention to provide a relatively simple and more compact Löffler-type boiler arrangement.

In brief, the present invention achieves these objects by providing a centrally disposed hot steam inlet pipe which extends through a series of evaporator cups provided in the boiler vessel. Water is provided in the evaporator cups.

According to the invention, the hot steam inlet pipe is formed from a plurality of individual inlet pipe segments to each of which one of the evaporator cups is attached. Each evaporator cup includes a bottom chamber which is formed between two bottom layer members. An opening is provided between successive inlet pipe segments. This opening is surrounded by an annular chamber which is connected to the evaporator cup bottom chamber. By this arrangement, hot steam is introduced into the boiler by way of the inlet pipe and is delivered from the inlet pipe openings to the annular chamber surrounding each opening and from there to the evaporator cup bottom chamber. The upper layer member of each evaporator cup is provided with perforations from which the hot steam passes after being delivered to the bottom chamber. The hot steam then passes through boiling water in the evaporator cup to become supersaturated.

For the purpose of expediting the construction of such apparatus, it has been found advantageous to combine the evaporator cups having the bottom chamber with the external wall defining the annular chamber at each inlet pipe opening. Thus arranged, these elements together comprise one structural unit which can be readily assembled together in the boiler apparatus.

BRIEF DESCRIPTION OF THE DRAWINGS

FIG. 3a is a cross-sectional view of a portion of one embodiment of the evaporator cups according to the invention.

FIG. 3b is a cross-sectional view of a portion of another embodiment of the evaporator cups according to the invention.

FIG. 3c is a cross-sectional view of a portion of yet another embodiment of the evaporator cups according to the invention.

DESCRIPTION OF THE PREFERRED EMBODIMENTS

Figure 2:
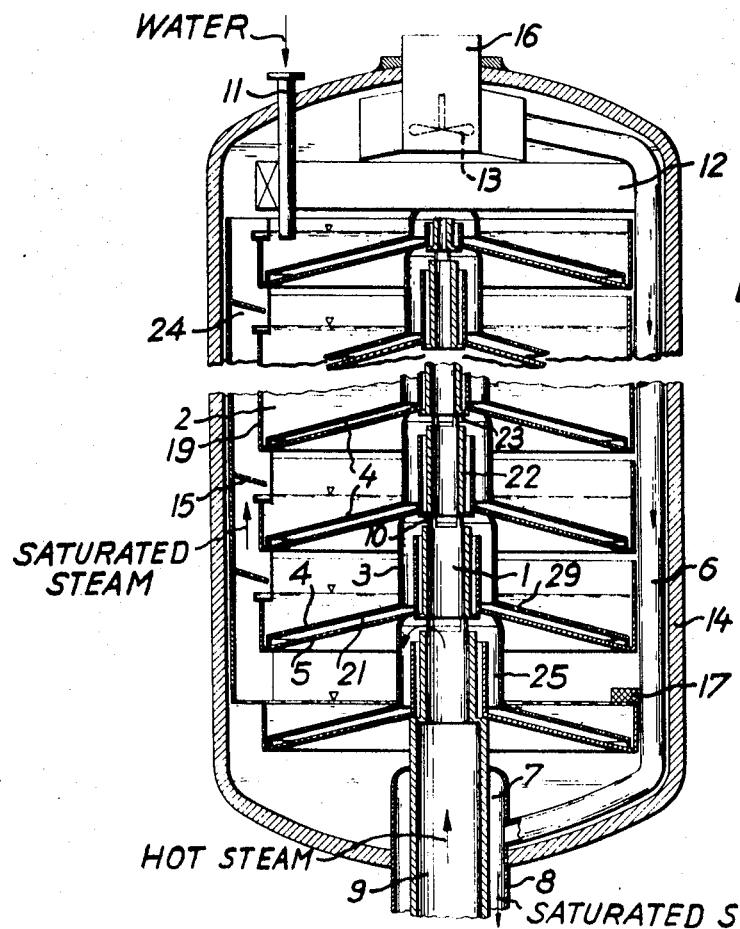
FIG. 2 is a sectional view taken substantially along the plane defined by reference line 2—2 of FIG. 1.
Figure 1:
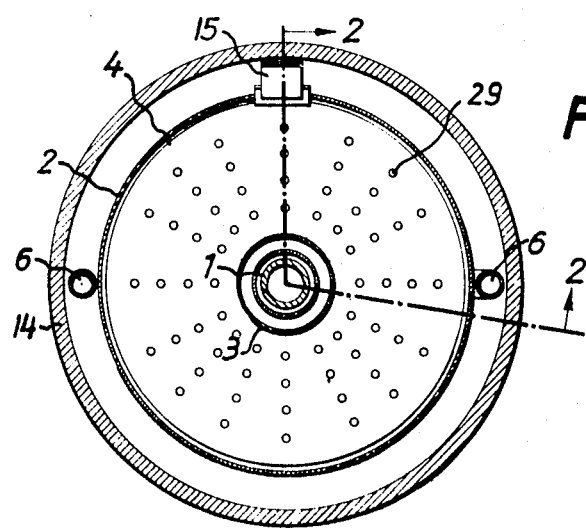
FIG. 1 is a horizontal sectional view of the Löffler saturated-steam generator according to the invention.

Referring now to both FIGS. 1 and 2, a saturated-steam generator of the Löffler type is shown therein.

The outer limits of the saturated-steam generator are defined by boiler vessel 14. Extending longitudinally into the generator through boiler vessel 14 is a hot steam inlet pipe 1. The inlet pipe 1, as best shown in FIG. 2, is centrally disposed within boiler vessel 14. Moreover, inlet pipe 1 is formed from a plurality of serially arranged segments 22. The segments 22 each have different diameters and are arranged in order according to decreasing inside diameters. Thus the diameter of inlet pipe 1 decreases the further it extends from its inlet end 9. Each pipe segment 22 is provided with a ledge or extension 23 at its end nearest the inlet end 9 of inlet pipe 1. Each extension 23 provides a support on which to place an evaporator cup 2 attached to and associated with each segment 22. The radial extension 23 of the pipe segment 22 nearest inlet 9 supports the evaporator cup 2, likewise nearest inlet 9. Beginning with the second such extension 23 away from inlet end 9 of the inlet pipe 1, steam exit openings or apertures 10 are provided between successive pipe segments 22.

As best seen in FIG. 2, each evaporator cup 2 is provided with an outer annular wall member 19, an inner annular wall 3 and a double-layered bottom including an upper layer member 4 and a lower layer member 5. As shown, water is held in the cup. The layer members 4 and 5 are spaced apart and together define a chamber 21 in the bottom of evaporator cup 2. The inner annular wall 3 surrounds pipe segment 22 and steam exit apertures 10 and defines at least in part with segment 22 an annular aperture chamber 25 at steam exit apertures 10. The annular aperture chamber 25 is in communication with evaporator cup bottom chamber 21.

By this arrangement, steam is introduced into the confines of evaporator cups 2 by first passing through the openings 10 into aperture chambers 25 and from there into the bottom chambers 21. The upper layer member 4 of each evaporator cup bottom is, furthermore, provided with perforations 29 from which steam collected in bottom chamber 21 enters cup 2 and passes through the water provided therein.

Due to the fact that the inside diameter of the superheated steam inlet pipe 1 narrows the further it extends from the inlet end 9, the cross section of the flow area of the hot steam changes likewise. Therefore, at an approximately equal saturated-steam pressure within the saturated-steam generator, the amount of steam input can be varied from one evaporator cup to another. Accordingly, the effective steam entry cross section is changed from cup to cup by varying the spacing between perforations 29 and/or the cross-sectional area of each perforation 29 provided. This aspect of the invention is particularly important especially during the process of filling the evaporator cups 2 with water.

As shown in FIG. 2, the pipe 11 delivers water only to the evaporator cup 2 furthest from inlet end 9. As the cup 2 overflows, the liquid therefrom flows by way of a water guide 15 into the evaporator cup 2 disposed immediately below. The overflow continues from cup to cup until the lowermost cup 2 is reached. Water reaching the bottom portion of the enclosing boiler vessel 14 by way of the overflow path just described is heated to the boiling point. Thus, it is necessary to introduce water into the saturated-steam generator from only one point in the arrangement and the fill level is only held at a required level in the evaporator cup 2 nearest inlet end 9 which is also the first evaporator cup. The water level in the first evaporator cup 2 may be controlled by a means, such as device 17, and additional regulating and controlling means provided in the water supply line (not shown). For instance the device 17 may consist of an floating switch.

A common annular saturated-steam collection chamber 24 is provided between the boiler vessel 14 and the evaporator cups 2. By this arrangement, the entire boiler vessel 14 is heated to the saturated-steam temperature. This constitutes a great advantage in designing the boiler vessel 14 especially in determining how thick to make the boiler vessel wall in order to insure safe operation.

In order to avoid thermal stresses in the saturated-steam generator according to the invention, when hot steam is delivered to the boiler vessel 14, the saturated steam already generated therein is discharged therefrom through a jacket pipe 8 surrounding the hot steam inlet pipe 1 at its inlet end 9.

In the confines of boiler vessel 14 a steam dryer 12 for the saturated steam is provided at the far end of the series or row of evaporator cups 2 away from inlet end 9 of the inlet pipe 1. If the saturated steam which is to be superheated in the nuclear reactor (not shown) includes an excessive amount of water droplets, these droplets are first evaporated in the steam dryer 12. Since the heat required for the evaporation of water is substantially higher than the specific heat of saturated steam, this subsequent evaporation will result in a smaller increase in the temperature of the steam during superheating.

Furthermore, a compressor 13 is connected directly to the steam dryer 12 to drive the saturated steam generated through tube means 6 to the interior 7 of jacket pipe 8. The drive means 16 of the compressor 13 is preferably located outside boiler vessel 14, whereas the compressor 13 itself is disposed within the boiler vessel 14.

Other embodiments of the present invention show a hot steam inlet pipe of uniform rather than varying diameter as in the previous embodiment.

Referring to FIGS. 3a and 3b, in particular, the bottoms of the evaporator cups 20 and 20', respectively, are positively inclined (i.e., form an acute angle with reference to the axes of their respective inlet pipes). As shown in FIG. 3c, the evaporator cup 20'' is negatively inclined (i.e., forms an obtuse angle with respect to the axis of its inlet pipe).

Referring again to FIG. 3a, an additional bottom layer 18 is disposed between the perforated bottom layer member 40 and the bottom layer member 50. Hot steam first enters the chamber 26 formed between the layer member 18 and the layer 50 and from there passes through an aperture 27 provided in the intermediate layer member 18 into a chamber 28 formed between intermediate layer member 18 and the perforated layer member 40. In the evaporator cup arrangement shown in FIG. 3a, as well as in the evaporator cup arrangement shown in FIG. 3c, the hot steam enters the area underneath the perforated layer in the vicinity of where the depth of the water is least. In FIG. 3b, the steam enters the area beneath the perforated layer in the vicinity of where the depth of the water in the cup is greatest.

With the embodiments of the invention according to FIGS. 3a through 3c, it is possible to achieve different dynamic behaviors. In these embodiments, a certain automatic control effect is realized. Because the steam resistance to flow is greater where the pressure on the steam is greater, the hot steam entering the bottom of the evaporator cup will not flow across the entire perforated surface of the evaporator cup. The hot steam will find the path of least resistance to flow which is where the depth of water in the cup is least. Thus, the amount of hot steam required depends on the resistance to flow encountered which in turn depends on the water depth through which the steam must pass.

It will be understood that the above description of the present invention is susceptible to various modifications, changes and adaptations, and the same are intended to be comprehended within the meaning and range of equivalents of the appended claims.

We claim:

1. In a Löffler-type boiler for producing saturated steam for cooling nuclear reactors wherein containers are disposed in said boiler for holding water at a plurality of vertically spaced levels within said boiler, the improvement comprising, in combination:
   a. a hot steam inlet pipe disposed within said boiler for delivering steam thereto from a source;
   b. a plurality of evaporator cups disposed within said boiler and arranged in series at spaced intervals along said inlet pipe; and
   c. means for conducting water to said evaporator cups;
   d. said inlet pipe being centrally disposed with respect to said evaporator cups and said boiler for conducting steam into contact with the water in said evaporator cups.

2. A arrangement as defined in claim 1 wherein said inlet pipe is further defined by a plurality of individual pipe segments, and each of said plurality of evaporator cups being attached to one of said pipe segments, respectively.

3. An arrangement as defined in claim 2 wherein each of said pipe segments is further defined by an extension provided on the outside thereof, and an evaporator cup is removably attached to each one of said pipe segment extensions, respectively.

4. The arrangement as defined in claim 3 wherein said inlet pipe includes an inlet end and said pipe segments are of different diameters, said pipe segments being arranged in order of successively decreasing diameters from said inlet end, such that the diameter of said inlet pipe decreases progressively away from said inlet end.

5. The arrangement as defined in claim 4 wherein said inlet pipe is further defined by:
   a. openings along its length between successive ones of said pipe segments;
   b. said inlet pipe being surrounded at each of said inlet pipe openings with an external wall, said inlet pipe and aid external wall forming an annular aperture chamber;
   c. said evaporator cups having a double-layered bottom;
   d. said double-layered bottom comprising an upper layer member and a lower layer member;
   e. a bottom chamber defined between said upper layer member and said lower layer member;
   f. conduit means for connecting said bottom chamber to said aperture chamber whereby steam introduced through said inlet pipe openings into said aperture chamber is conveyed to said bottom chamber; and
   g. said upper layer member being provided with perforations for passage therethrough of steam collected in the bottom chamber.

6. The arrangement as defined in claim 5 wherein each of said double-layered bottom evaporator cups together with said external wall surrounding said inlet pipe at each of said inlet pipe openings forms an integrated constructive unit.

7. The arrangement as defined in claim 6 wherein said evaporator cups are further defined by having said double-layered bottoms inclined toward said inlet end of said inlet pipe to form an obtuse angle with the central axis of said inlet pipe.

8. The arrangement as defined in claim 7 wherein said evaporator cups have upper layer members which include perforations of a particular size and/or spaced apart at a particular distance.

9. The arrangement as defined in claim 7 wherein the amount of steam passing from each evaporator cup varies from evaporator cup to evaporator cup.

10. The arrangement as defined in claim 8 wherein each of said evaporator cups is further defined by an intermediate layer disposed in said bottom chamber between said upper layer and said lower layer; and said intermediate layer is provided with steam passage holes in the vicinity of its outer and/or inner limits relative to the central axis of said inlet pipe.

11. The arrangement as defined in claim 10 wherein an annular boiler chamber is provided between said evaporator cups and a vessel defining the outer bounds of said boiler in which said cups are disposed; and a. a steam dryer means is disposed in said boiler positioned at the end of said row of evaporator cups furthest away from the inlet end of said inlet pipe, b. said boiler chamber being in communication with said steam dryer means whereby steam having been saturated in said evaporator cups and collected in said boiler chamber is then conveyed to said steam dryer means for processing.

12. The arrangement as defined in claim 11 wherein, further, a. a compressor means is disposed within said boiler in communication with said steam dryer for receiving dried saturated steam therefrom;

b. drive means are provided for said compressor which drive means are disposed outside of said boiler;

c. a jacket pipe is provided at the inlet end of said inlet pipe, said jacket pipe being in surrounding relationship to said inlet pipe; and d. tube means are provided for conveying said dried saturated steam to said jacket pipe surrounding said inlet pipe at the inlet end thereof.

UNITED STATES PATENT OFFICE
CERTIFICATE OF CORRECTION

Patent No. 3,612,000          Dated October 12th, 1971

Inventor(s) Karl-Heinrich Lochmann and Gerhard Dinges

It is certified that error appears in the above-identified patent and that said Letters Patent are hereby corrected as shown below:

In the heading of the patent, line 10, change "Mar.27" to --Mar.22--. Column 1, line 40, change "Löffer" to --Löffler--.

Signed and sealed this 18th day of April 1972.

(SEAL)
Attest:

EDWARD M. FLETCHER, JR.                ROBERT GOTTSCHALK
Attesting Officer                      Commissioner of Patents